(12) United States Patent
Yamazaki

(10) Patent No.: US 8,520,486 B2
(45) Date of Patent: Aug. 27, 2013

(54) OPTICAL PICKUP DEVICE AND OPTICAL DISC APPARATUS

(75) Inventor: Kazuyoshi Yamazaki, Yamato (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 0 days.

(21) Appl. No.: 13/372,529

(22) Filed: Feb. 14, 2012

(65) Prior Publication Data
US 2012/0213046 A1 Aug. 23, 2012

(30) Foreign Application Priority Data
Feb. 17, 2011 (JP) .................................. 2011-032285

(51) Int. Cl.
*G11B 7/00* (2006.01)
(52) U.S. Cl.
USPC .................................. 369/112.01; 369/112.03
(58) Field of Classification Search
USPC .............. 369/112.1, 112.01, 112.02, 112.16, 369/112.18, 112.26, 112.03
See application file for complete search history.

(56) References Cited

U.S. PATENT DOCUMENTS

| 7,660,226 | B2 * | 2/2010 | Ogata ...................... 369/112.18 |
| 8,023,390 | B2 * | 9/2011 | Shimano et al. ......... 369/112.16 |
| 2008/0067321 | A1 | 3/2008 | Miyamoto et al. |
| 2008/0205246 | A1 | 8/2008 | Shimano et al. |

FOREIGN PATENT DOCUMENTS

| JP | 2008-65961 | 3/2008 |
| JP | 2008-310942 | 12/2008 |
| JP | 2009-15944 | 1/2009 |

* cited by examiner

*Primary Examiner* — Nabil Hindi
(74) *Attorney, Agent, or Firm* — Antonelli, Terry, Stout & Kraus, LLP.

(57) ABSTRACT

In an optical pickup device for a simple optical system, a light beam emitted from a laser diode is split into first and second light beams by a polarized beam splitter, an optical disc is irradiated with the first light beam to obtain signal light, and the second beam is reflected by a reflection element to obtain reference light. Light beams of the signal light and the reference light are synthesized into one light beam, the synthesized light beam is separated into four light beams by a phase difference forming unit including a grating, a divided wave plate and a polarization grating, and different phase differences are afforded to the signal light and the reference light in each light beam. The four light beams are detected by one detector to generate the reproduction signal.

12 Claims, 10 Drawing Sheets

10A

OPTICAL PICKUP DEVICE AND OPTICAL DISC APPARATUS

CLAIM OF PRIORITY

The present application claims priority from Japanese Patent Application Serial No. JP 2011-032285, filed on Feb. 17, 2011, the content of which is hereby incorporated by reference into this application.

BACKGROUND OF THE INVENTION

1. Field of the Invention

The present invention relates to an optical pickup device for reproducing information stored in an optical disc such as a DVD (Digital Versatile Disc) or a BD (Blu-ray Disc) and an optical disc apparatus using the optical pickup device.

2. Description of the Related Art

An optical disc such as a DVD or a BD is configured as a multi-layer disc including two or more recording layers to increase its recording capacity. It is expected to more and more increase the recording capacity by increasing the number of recording layers in the future. However, it is unavoidable to reduce the reflectance per layer in order to increase the number of recording layers and to obtain signal light from each recording layer. As a result, such a problem may occur that a sufficient S/N ratio of a reproduction signal is not ensured and hence stable reproduction is not attained. In addition, since high-speed reproduction becomes desirable with an increase in capacity, it becomes inevitable to increase the S/N ratio of the reproduction signal.

As a technique involving an increase in S/N ratio of a reproduction signal, a technique of splitting light emitted from a light source into several streaks of light before an optical disc is irradiated with it, synthesizing light which is not used for irradiation of the optical disc with light reflected from the optical disc to cause interference between them so as to amplify the amplitude of a detection signal from the optical disc is known. For example, Japanese Patent Application Laid-Open No. 2008-65961 discloses a configuration that an optical beam emitted from a light source is divided into first and second optical beams, the first optical beam is condensed on an optical disc to irradiate the disc with it, signal light reflected from the optical disc is guided to four detectors, and the second optical beam is not condensed on the optical disc and is guided to the four detectors as reference light, then, the signal light is made to optically interfere with the reference light in an out-of-phase state on the four detectors and all or some of outputs from the four detectors are arithmetically operated selectively to obtain a reproduction signal.

SUMMARY OF THE INVENTION

It is described that according to the configuration disclosed in Japanese Patent Application Laid-Open No. 2008-65961, a high S/N ratio signal is detected, adjustment of an optical path difference so as to bring two streaks of light into a predetermined phase relation is eliminated in principle, and hence an interference type detection system which is high in signal amplifying effect and is suited for downsizing of an optical system is obtained.

However, according to the configuration disclosed in Japanese Patent Application Laid-Open No. 2008-65961, it is unavoidable to dispose four detectors and to provide a light splitting element for making a light beam incident on the four detectors. Therefore, the optical system of the optical pickup device may be complicated and further improvement is desirable for downsizing. In addition, use of a plurality of optical components such as the detectors and the light splitting element may lead to an increase in cost.

Accordingly, an object of the present invention is to provide an optical pickup device for a simple optical system which is high in S/N ratio of a reproduction signal and is suited for downsizing and an optical disc apparatus using the optical pickup device.

The present invention has been made in order to solve the above mentioned problems. According to an embodiment of the invention, an optical pickup device includes a laser diode which emits a light beam of laser light, a polarized beam splitter which splits the light beam emitted from the laser diode into a first light beam and a second light beam and synthesizes signal light obtained from the first light beam with reference light obtained from the second light beam, an objective lens which irradiates the optical disc with the first light beam to obtain the signal light, a reflection element which reflects the second light beam with no irradiation of the optical disc with the second light beam to obtain the reference light, a phase difference forming unit which separates the light beam synthesized by the polarized beam splitter into a plurality of light beams and affords different phase differences to the signal light and the reference light (that is, making the signal light and the reference light have different phase differences) included in the respective light beams and a common detector including a plurality of light receiving parts which receives the plurality of separated light beams. Here, the phase difference forming unit includes a grating, a divided wave plate and a polarization grating.

The grating diffracts an incident light beam to separate it into two or more light beams, the divided wave plate is segmented into two or more regions including a quarter wave plate and a half wave plate for affording predetermined phase differences to incident light beams, and the polarization grating diffracts an incident light beam of a specific polarization to separate the light beam into two or more light beams.

According to the present invention, an optical pickup device which is increased in S/N ratio of a reproduction signal by making signal light interfere with reference light and is reduced in the number of components of an optical system so as to be suited for downsizing and an optical disc apparatus using the optical pickup device are provided.

BRIEF DESCRIPTION OF THE DRAWINGS

FIG. 2A to FIG. 2C are diagrams illustrating constitutional components of a phase difference forming unit 20 in FIG. 1, in which FIG. 2A illustrates a grating 12, FIG. 2B illustrates a divided wave plate 13 and FIG. 2C illustrates a polarization grating 14;

FIG. 8A to FIG. 8C are diagrams illustrating the constitutional components of the phase difference forming unit 20 according to an embodiment 2, in which FIG. 8A illustrates the grating 12, FIG. 8B illustrates the divided wave plate 13 and FIG. 8C illustrates the polarization grating 14;

FIG. 10A to FIG. 10O are diagrams illustrating the constitutional components of the phase difference forming unit 20 according to an embodiment 3, in which FIG. 10A illustrates the grating 12, FIG. 10B illustrates the divided wave plate 13 and FIG. 10O illustrates the divided wave plate 14;

FIG. 13A to FIG. 13C are diagrams illustrating constitutional components of the phase difference forming unit 20 in FIG. 12, in which FIG. 13A illustrates a grating 22, FIG. 13B illustrates a divided wave plate 23 and FIG. 13C illustrates a polarization grating 24;

DETAILED DESCRIPTION OF THE PREFERRED EMBODIMENTS

Hereinafter, preferred embodiments of the present invention will be described with reference to the accompanying drawings.

Embodiment 1

Figure 1:
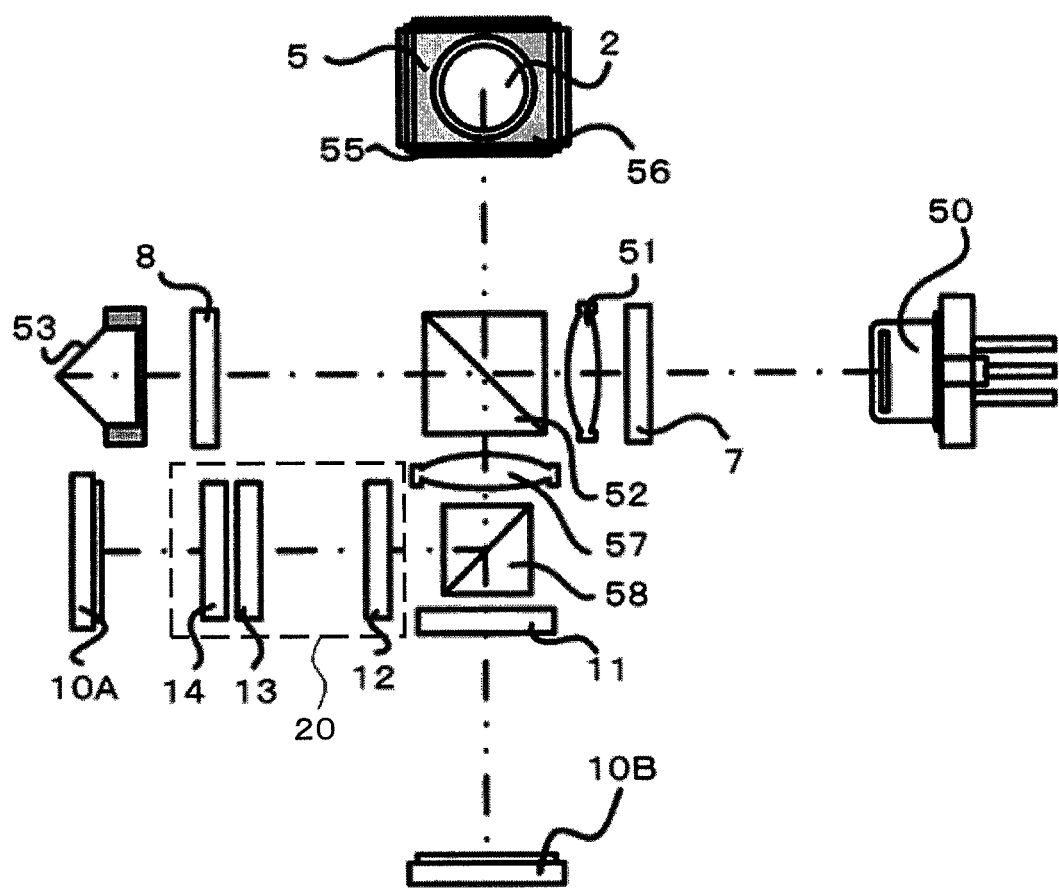
FIG. 1 is a diagram illustrating an optical system of an optical pickup device according to an embodiment 1.

FIG. 1 is a diagram illustrating an optical system of an optical pickup device according to an embodiment 1 of the present invention. Although the embodiment 1 aims to reproduce data stored in a BD multi-layer disc, an optical disc other than the above or a single-layer disc may be used.

A light beam of about 405 nm in wavelength is emitted from a laser diode 50 as divergent light. The emitted light beam passes through a half wave plate 7, is converted into an almost collimated light beam by a collimator lens 51 and is incident on a polarized beam splitter 52. The polarized beam splitter 52 is a light splitting element having a function of reflecting almost 100% of s-polarized light and transmitting almost 100% of p-polarized light.

A light beam of s-polarized light reflected by the polarized beam splitter 52 is reflected by a reflection mirror 55, is incident on a quarter wave plate 56 and is converted into circularly polarized light. Then, a light beam of the circularly polarized light is condensed on a predetermined recording layer of the optical disc (the BD multi-layer disc) through an objective lens 2 loaded on an actuator 5. The light beam of the circularly polarized light beam reflected from the recording layer of the optical disc is incident on the quarter wave plate 56 through the objective lens 2 and is converted into p-polarized light, and returns to the polarized beam splitter 52 via the reflection mirror 55. The light beam is p-polarized light and transmits through the polarized beam splitter 52 to be used as "signal light".

On the other hand, a light beam of p-polarized light that has been emitted from the laser diode 50 and has transmitted through the polarized beam splitter 52 is incident on a quarter wave plate 8 and is converted into circularly polarized light, and is incident on a cube corner reflector 53 which is a reflecting element. Here, the cube corner reflector 53 is an optical element of the type of reflecting light beams in the same direction regardless of incident angles at which light beams are incident. A light beam of the circularly polarized light reflected by the cube corner reflector 53 is incident on the quarter wave plate 8 and is converted into s-polarized light, and returns to the polarized beam splitter 52. The light beam is s-polarized light and is reflected by the polarized beam splitter 52 to be used as "reference light".

In the polarized beam splitter 52, the light beam (the signal light) reflected from the optical disc is synthesized with the light beam (the reference light) reflected by the cube corner reflector 53. In the above mentioned case, the signal light which is s-polarized light is synthesized with the reference light which is s-polarized light in a state that their polarization directions are orthogonal to each other. In the following, an optical path through which the signal light and the reference light pass as one light beam will be described.

The light beam synthesized by the polarized beam splitter 52 is converged upon a detecting lens 57 and is incident on a polarized beam splitter 58 which is a light splitting element. Here, it is assumed that in the polarized beam splitter 58, a reflectance of the s-polarized reference light is set high, almost 100% of the s-polarized reference light is reflected and an almost half of the p-polarized reference light is reflected (the remaining light transmits through the splitter 58). In the above mentioned situation, a reproduction signal is generated from the light beam (the signal light and the reference light) reflected by the polarized beam splitter 58 and a servo signal is generated from the light beam (the signal light) that has transmitted through the polarized beam splitter 58.

The light beam (the signal light and the reference light) reflected by the polarized beam splitter 58 is incident on the phase difference forming unit 20 (indicated by a broken line). The phase difference forming unit 20 includes a grating (non-polarization) 12, a divided wave plate 13 and a polarization grating 14 and has functions of separating the incident light beam into four light beams and affording different phase differences to the signal light and the reference light included in each light beam. The grating 12 separates the light beam into two light beams, the divided wave plate 13 affords a phase difference to the two separated light beams, and the polarization grating 14 further separated the light beams into four light beams (that is, each beam is separated into two beams). The four light beams are respectively detected by four light receiving parts disposed on the detector 10A and a reproduction signal is generated by arithmetically operating detection signals from the four light receiving parts. Details of the phase difference forming unit 20 and the detector 10A will be described later.

On the other hand, the light beam (the signal light) that has transmitted through the polarized beam splitter 58 is incident on the grating 11 including a plurality of regions and is separated into respective light beams through the regions. The separated light beams are outgoing from the regions in different directions and are focused on the detector 10B. A plurality of light receiving parts are formed on the detector 10B and irradiated with the light beams separated by the grating 11. A detection signal is output from each light receiving part in accordance with a quantity of light with which each light receiving part is irradiated and servo signals such as a focusing error signal, a tracking error signal and the like are generated by arithmetically operating these outputs (the detection signals). Then, the actuator 5 on which the objective lens 2 is loaded is driven in an optical axis direction with the focusing error signal to control focusing. In the above mentioned case, the cube corner reflector 53 may be also driven in the optical axis direction with the focusing error signal in order to generate a stable reproduction signal from the detection signals output from the detector 10A.

Next, configurations and operations of the phase difference forming unit 20 and the detector 10A will be described in detail.

Figure 2A:
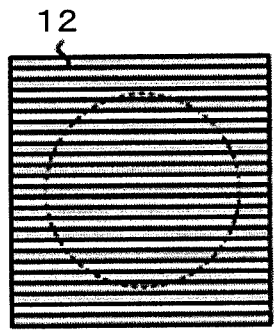
Figure 2B:
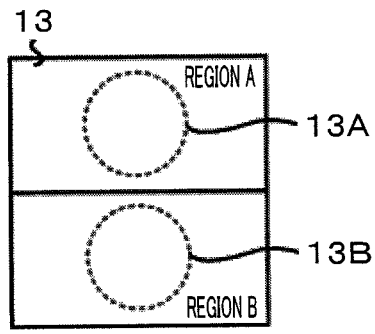
Figure 2C:
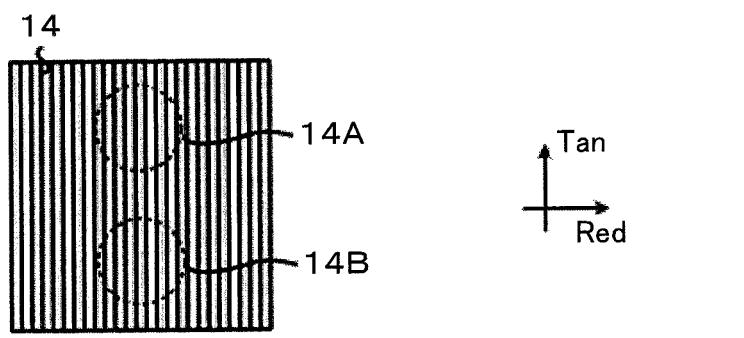

FIG. 2A to FIG. 2C are diagrams illustrating constitutional components of the phase difference forming unit 20, in which FIG. 2A illustrates the grating 12, FIG. 2B illustrates the divided wave plate 13 and FIG. 2C illustrates the polarization grating 14. In FIG. 2A to FIG. 2C, a dotted line indicates the outline of a light beam, Rad indicates a disc radial direction and Tan indicates a disc tangential direction.

First, an incident light beam is separated into two light beams by the grating (non-polarization) 12. Here, it is assumed that diffraction efficiencies of the grating 12 for 0-order diffracted light, +first-order diffracted light and −first-order diffracted light are set to the rate of, for example, 0:1:1. However, the rate of the diffraction efficiencies is not limited to the above and may be 1:1:0 or may have any other value. Since the light beams are converged on the detecting lens 57 as converged light, when the light beam so converged is separated into two light beams by diffraction, effective diameters of the light beams are reduced simultaneously. The two light beams (+first-order light and −first-order light) outgoing from the grating 12 are incident on the divided wave plate 13.

The divided wave plate 13 is disposed at a position where the two light beams from the grating 2 are separated. The divided wave plate 13 is segmented into two regions A and B and two light beams, that is, +first-order light 13A and −first-order light 13B are respectively incident on the regions A and B. The region A includes a half wave plate and the region B includes a quarter wave plate. The divided wave plate 13 may be a photonic crystal wave plate or a region-segmented crystal wave plate. In addition, it may be a wave plate configured by affixing together two wave plates. The half wave plate rotates a polarization direction of the light beam 13A that has been incident on the region A by 45 degrees. The quarter wave plate affords a phase difference to the light beam 13B that has been incident on the region B. The two light beams that have transmitted through the divided wave plate 13 are incident on the polarization grating 14.

The two light beams that have passed through the divided wavelength plate 13 are respectively incident upon different regions of the polarization grating 14 as light beams 14A and 14B. Signal light and reference light are included in each of the light beams 14A and 14B. Here, it is assumed that diffracting action occurs in the polarization grating 14 only when light of a specific polarization, for example, s-polarized light is incident and then diffraction efficiencies of the polarization grating 14 for 0-order diffracted light, +first-order diffracted light and −first-order diffracted light are set to the rate of, for example, 0:1:1. Thus, when p-polarized light and s-polarized light are incident on the polarization grating 14, the p-polarized light is obtained as transmitted light and the s-polarized light is obtained as +first-order light. As a result, each of the light beams 14A and 14B is separated into two streaks of mutually orthogonal linearly polarized light and hence light beams totaling to four are outgoing. In the above mentioned case, four phase differences, that is, 0°, 90°, 180° and 270° phase differences are produced between the signal light and the reference light in the light beams. The four light beams are incident on the detector 10A.

Figure 3:
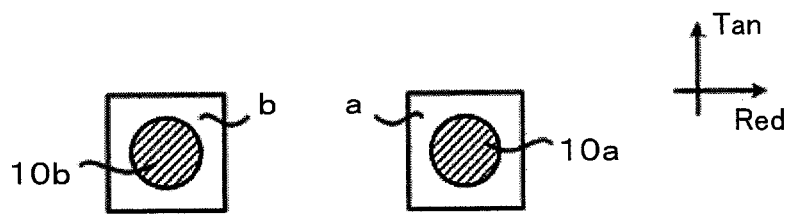
FIG. 3 is a diagram illustrating arrangement of light receiving parts on a detector 10A in FIG. 1.
Figure 3:
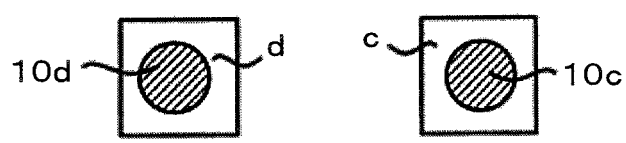
Figure 3:
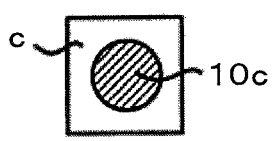

FIG. 3 is a diagram illustrating arrangement of light receiving parts on the detector 10A. The detector 10A includes four light receiving parts a, b, c and d. Two streaks of mutually orthogonal linearly polarized light 10a and 10b that have been separated from the light beam 14A by the polarization grating 14 are incident on the light receiving parts a and b of the detector 10A. Two streaks of mutually orthogonal linearly polarized light 10c and 10d that have been separated from the light beam 14B by the polarization grating 14 are incident on the light receiving parts c and d of the detector 10A. In the above mentioned case, streaks of p-polarized light that have transmitted through the polarization grating 14 are incident on the light receiving parts a and c and streaks of the s-polarized light which is the +first-order diffracted light from the polarization grating 14 are incident on the light receiving parts b and d.

Here, interference occurs in the light beam 10a on the detector 10A with a 0° phase difference between the reference light and the signal light and interference occurs in the optical beam 10b on the detector 10A with a 180° phase difference between the reference light and the signal light. Likewise, interference occurs in the light beam 10c on the detector 10A with a 90° phase difference between the reference light and the signal light and interference occurs in the light beam 10d on the detector 10A with a 270° phase difference between the reference light and the signal light. Therefore, when Es is an electric field vector of signal light and Er is an electric field vector of reference light, signals A, B, C and C obtained from the receiving parts a, b, c and d on the detector 10A are expressed by the following formulae.

[Numerical Formulae 1]

$$A = \left| \frac{1}{2}Es + \frac{1}{2}Er \right|^2$$
$$= \frac{1}{4}|Es|^2 + \frac{1}{4}|Er|^2 + \frac{1}{2}|Es||Er|\cos(\theta s - \theta r)$$

$$B = \left| \frac{1}{2}Es - \frac{1}{2}Er \right|^2$$
$$= \frac{1}{4}|Es|^2 + \frac{1}{4}|Er|^2 - \frac{1}{2}|Es||Er|\cos(\theta s - \theta r)$$

$$C = \frac{1}{8}|(1-i)Es + (1+i)Er|^2$$
$$= \frac{1}{4}|Es^2| + \frac{1}{4}|Er^2| + \frac{1}{2}|Es||Er|\sin(\theta s - \theta r)$$

$$D = \frac{1}{8}|(1+i)Es + (1-i)Er|^2$$
$$= \frac{1}{4}|Es^2| + \frac{1}{4}|Er^2| - \frac{1}{2}|Es||Er|\sin(\theta s - \theta r)$$

In the formulae, ($\theta s - \theta r$) indicates a phase difference between the electric field vector Es of the signal light and the electric field vector Er of the reference light. Here, the signal light and the reference light are described as coherent light for ready understanding. Here, differential signals between the signals A and B and the signals C and D are arithmetically operated as expressed by the following formulae.

[Numerical Formulae 2]

$$A - B = |Es||Er| \cos(\theta s - \theta r) \quad (1)$$

$$C - D = |Es||Er| \sin(\theta s - \theta r) \quad (2)$$

Here, a reproduction signal (RF) of the embodiment 1 is generated by arithmetically operating a square root of sum of squares of the formulae (1) and (2).

$$RF = \sqrt{(A-B)^2 + (C-D)^2}$$
$$= |Es||Er|$$
[Numerical Formula 3]

In generation of the reproduction signal RF, detection of stable signals is allowed by performing arithmetic operations as mentioned above regardless of the phase difference ($\theta s-\theta r$) between the signal light and the reference light. Then, since signal light obtained when it is detected by a general system is indicated by $|Es|^2$, an amplification factor Am of the reproduction signal according to the embodiment 1 is expressed by the following formula.

$$Am = \frac{|Es||Er|}{|Es|^2}$$
$$= \frac{|Er|}{|Es|}$$
[Numerical Formula 4]

In the embodiment 1, the amplification factor Am is determined only by a rate of an electric field amplitude |Er| of the reference light to an electric field amplitude |Es| of the signal light. For example, when the quantity of light directed to a multi layer optical disc via the polarized beam splitter 52 is equal to that of light directed to the cube corner reflector 53 via the polarized beam splitter 52 and a reflectance of the multi layer optical disc is 1%, the intensity of the reference light is about 100 times that of the signal light on the detector 10A. Here, since the intensity of light is expressed by a square of the electric field amplitude, the amplification factor Am of the reproduction signal exhibits a ten-time increase ($\sqrt{100}=10$ times). That is, owing to the configuration of the embodiment 1, a high S/N ratio reproduction signal is obtained by amplifying the amplitude of the reproduction signal to a value which is about ten times as high as its original value. The configuration of the embodiment 1 is effectively used, in particular, when a reflectance of each recording region of a multi layer optical disc is low and/or when it is desirable to increase the S/N ratio in high speed reproduction.

In addition, according to the configuration of the embodiment 1, such an effect is attained that the amplitude of the reproduction signal is amplified by using one detector 10A by combining the grating 12, the divided wave plate 13 and the polarization grating 14 with one another. As a result, it is allowed to reduce the number of components to greatly reduce the size of the optical system as compared with a conventional system.

Although in the configuration of the embodiment 1, the reproduction signal is generated by separating the light beam including the signal light and the reference light into four light beams which are different from one another in phase difference, the number of light beams to be separated is not limited to the above and the same effect as the above is obtained by separating the light beam into a plurality of light beams which are different from one another in phase difference.

Next, a method of generating servo signals (a focusing error signal and a tracking error signal) according to the embodiment 1 will be described. In generation of the servo signals, a light beam (signal light) transmitted through the polarized beam splitter 58 is separated into a plurality of light beams by the grating 11 and the detector 10B receives the plurality of light beams.

Figure 4:
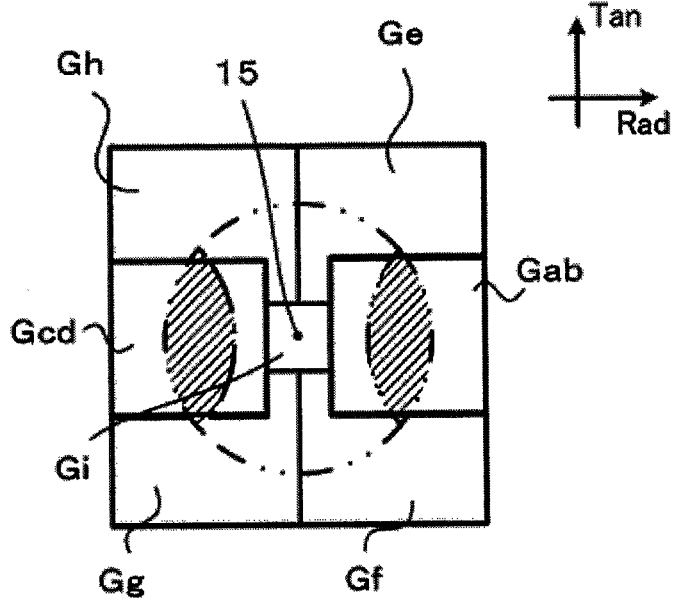
FIG. 4 is a diagram illustrating a form of a grating 11 in FIG. 1.

FIG. 4 is a diagram illustrating a form of the grating 11. A solid line indicates a boundary line between regions, a two-point chain line indicates the outline of a light beam of laser light, and a shaded part indicates an interference region (a push-pull pattern) between 0-order diffracted light and ±first-order diffracted light diffracted by tracks of an optical disc. The grating 11 includes regions Ge, Gf, Gg and Gh on which only the 0-order diffracted light of disc diffracted light diffracted by the tracks on the disc is incident, regions Gab and Gcd on which the 0-order diffracted light and ±first-order diffracted light of the disc diffracted light are incident and a region Gi including an almost central part of the 0-order diffracted light. Here, diffraction efficiencies of the grating 11 for the 0-order diffracted light, the +first-order diffracted light and the −first-order diffracted light are set to the rate of, for example, 0:1:1.

Figure 5:
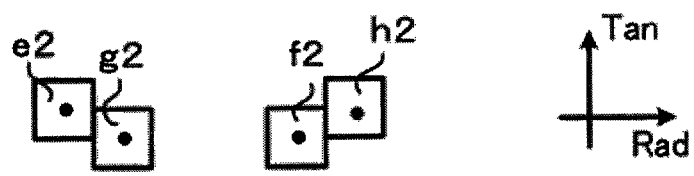
FIG. 5 is a diagram illustrating arrangement of light receiving parts on a detector 10B in FIG. 1.
Figure 5:
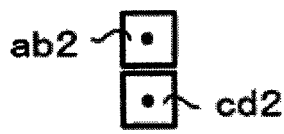
Figure 5:
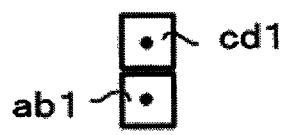
Figure 5:
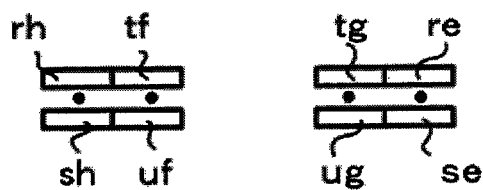

FIG. 5 is a diagram illustrating arrangement of light receiving parts on the detector 10B. A plurality of light receiving parts designated by ab1, ab2 and other reference numerals are disposed on the detector 10B. In FIG. 5, a black point indicates signal light. A relation between the regions of the grating 11 and the light receiving parts of the detector 10B is as follows. Beams of +first-order light diffracted through the regions Gab and Gcd of the grating 11 are respectively incident on the light receiving parts ab1 and cd1 of the detector 10B and beams of +first-order light diffracted through the regions Ge, Gf, Gg and Gh of the grating 11 are respectively incident on light receiving parts re, se, tg, ug, tf, uf, rh and sh for focusing error signal detection. Beams of −first-order light diffracted through the regions Gab, Gcd, Ge, Gf, Gg and Gh are respectively incident on light receiving parts ab2, cd2, e2, f2, g2 and h2.

When signals obtained from the light receiving parts ab1, cd1, re, se, tf, uf, tg, ug, rh, sh, ab2, cd2, e2, f2, g2 and h2 are designated by AB1, CD1, RE, SE, TF, UF, TG, UG, RH, SH, AB2, CD2, E2, F2, G2 and H2, the focusing error signal (FES) and the tracking error signal (TES) are generated by arithmetically operating the following formulae.

$FES = (SE+TG+TF+SH)-(RE+UG+UF+RH)$ $TES = \{(AB1+AB2)-(CD1+CD2)\}-kt\{(E2+F2)-(G2+H2)\}$
[Numerical Formulae 5]

In the formulae, kt is a coefficient for avoiding generation of a DC component in the tracking error signal when an objective lens has been displaced. In the above mentioned case, a knife-edge system is used as a focusing error detecting system. Since the knife-edge system is well known, description thereof will be omitted. In the formulae, since the signals AB1 and CD1 are components which are the same as the signals AB2 and CD2, these signals may be omitted in arithmetic operation or may be detected by the light receiving parts (the light receiving parts ab1 and cd1) disposed on one side by setting diffraction efficiencies of the regions Gab and Gcd of the grating 11 for 0-order diffracted light, +first-order diffracted light and −first-order diffracted light to the rate of, for example, 0:1:0.

As described above, according to the optical system of the optical pickup device of the embodiment 1, an effect of amplifying the amplitude of a reproduction signal is obtained by using one detector 10A by disposing the phase difference forming unit 20 including the grating 12, the divided wave plate 13 and the polarization grating 14 in converged light and hence it is allowed to reduce the number of components of the optical system to greatly reduce the size of the optical system as compared with a conventional system. Since the non-polarization type grating, the divided wave plate and the polarization grating used in the phase difference forming unit 20 are general purpose components and cheaper than electronic components such as detectors, the optical system of the embodiment 1 is highly advantageous also in cost.

The embodiment 1 may be altered as follows.

Figure 6:
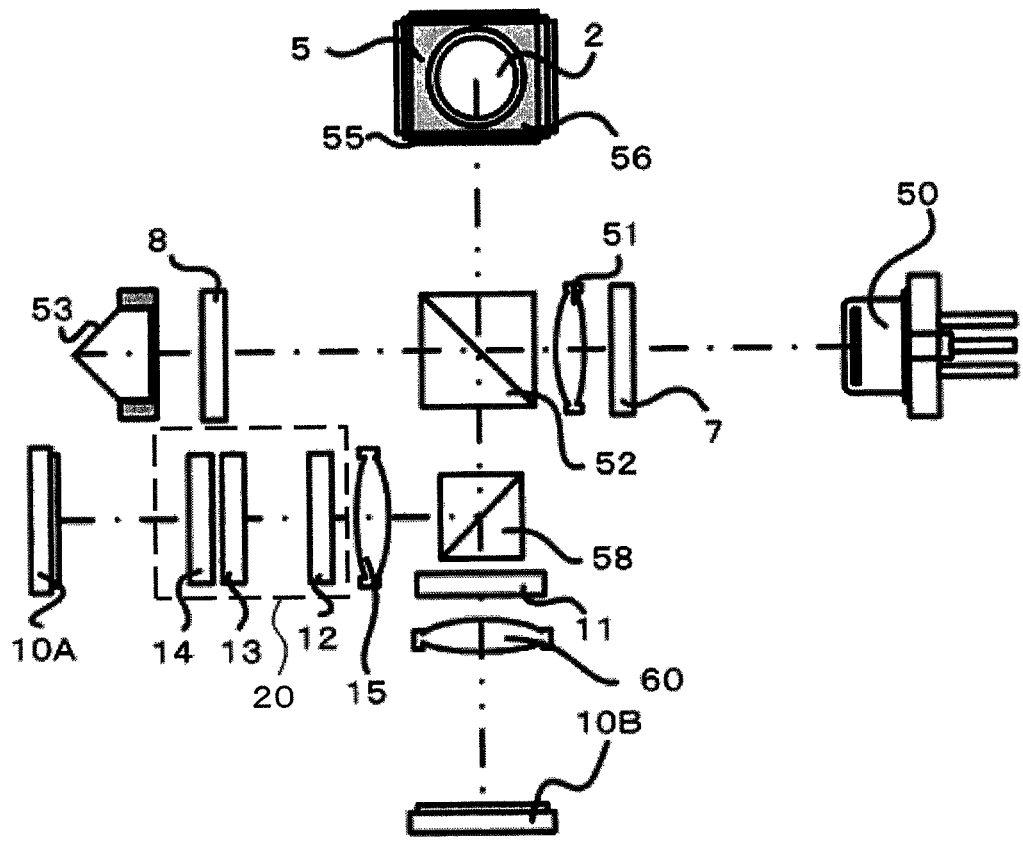
FIG. 6 is a diagram illustrating an altered embodiment of the optical system in FIG. 1.

FIG. 6 is a diagram illustrating an altered embodiment of the optical system in FIG. 1. In this altered embodiment, the detecting lens 57 in FIG. 1 is removed from a place on the side of the polarization beam splitter 58 to places on the sides of the detectors 10A and 10B as detecting lenses 15 and 60. As an alternative, the detecting lens 15 may be disposed behind the grating 12. In the latter case, the detecting lens 15, the grating 12, the divided wave plate 13 and the polarization grating 14 may be modularized. In addition, a module into which the detector 10A is incorporated may be used.

Figure 7:
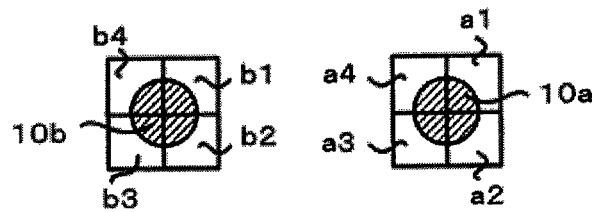
FIG. 7 is a diagram illustrating an altered embodiment of the detector 10A in FIG. 3.
Figure 7:
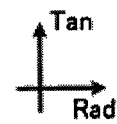
Figure 7:
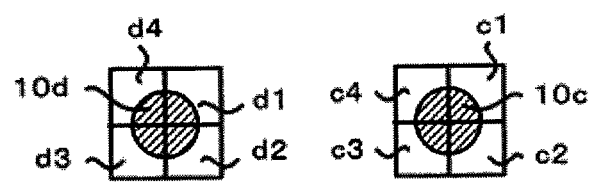

FIG. 7 is a diagram illustrating an altered embodiment of the detector 10A in FIG. 3. In this altered embodiment, each of the light receiving parts a, b, c and d of the detector 10A is divided into four parts. This embodiment allows amplification of the amplitude of a reproduction signal by performing arithmetic operations which are the same as the above using combinations of signals from light receiving parts a1, b1, c1 and d1, signals from light receiving parts a2, b2, c2 and d2, signals from light receiving parts a3, b3, c3 and d3 and signals from light receiving parts a4, b4, c4 and d4 which the same signal components. This system allows generation of tracking error signals (such as a push-pull signal and a DPD (Differential-Push-Pull) signal) from phase differences among obtained four signals.

Although in the embodiment 1 in FIG. 1, the cube corner reflector 53 is used as the reflecting element for reference light, a mirror may be used in place of the above. In addition, the effect of the embodiment 1 may be obtained even if the cube corner reflector 53 is not driven by the actuator 5.

A direction in which grooves are formed is not limited to directions in which grooves are formed in the grating 12 and the polarization grating 14 in FIG. 2A to FIG. 2C and the grooves may be formed in any direction unless diffracted light beams overlap one another on the divided wave plate 13 and the detector 10A. The same effect is obtained by using a polarized light splitting element such as a Wollaston prism in place of the polarization grating 14. In addition, the grating 12, the divided wave plate 13 and the polarization grating 14 may be modularized without separately disposing them. Further, a module with which the detector 10A is combined may be used. The divided wave plate 13 and the polarization grating 14 may be integrally affixed or may be disposed as one optical element having the same function.

In order to prevent saturation of signals from the viewpoint of signal output, a half wave plate may be rotated in an optical axis direction in accordance with rotation of an optical disc to change the amplification factor Am. The amplification factor may be also changed in the above mentioned manner in order to realize high X-speed recording. As a configuration for the above, a configuration that a dynamic polarized light converting element using, for example, a crystal is used or a configuration that a wave plate is be dynamically inserted may be adopted as the case may be.

In the embodiment 1, there is no limitation on a system of detecting the focusing error signal and the tracking error signal. In order to improve accuracy in detection, techniques described, for example, in Japanese Patent Application Laid-Open No. 2004-281026 (a fluctuation in amplitude of a tracking error signal which would occur with occurrence of an error in formation of track grooves is reduced), Japanese Patent Application Laid-Open No. 2008-135155 (tracking error signals are favorably detected for different kinds of optical discs) and Japanese Patent Application Laid-Open No. 2010-61751 (a stable servo signal is obtained without being adversely affected by stray light from other layers in a multi-layer optical disc) may be adopted.

Embodiment 2

Although the reproduction signal is obtained by separating one light beam including signal light and reference light into four light beams in the optical system according to the embodiment 1, an embodiment 2 is configured such that one light beam is separated into six light beams to generate a reproduction signal. Therefore, the embodiment 2 is different from the embodiment 1 in optical characteristics of the phase difference forming unit 20 (the grating 12, the divided wave plate 13 and the polarization grating 14) and arrangement of light receiving parts on the detector 10A.

In the embodiment 2, a light beam reflected by the polarized beam splitter 58 is separated into three light beams by the grating 12. The three light beams transmit through three regions of the divided wave plate 13 and are separated into six light beams by the polarization grating 14. The six light beams are respectively detected by six light receiving parts disposed on the detector 10A and a reproduction signal is generated on the basis of detection signals from the six light receiving parts.

Figure 8A:
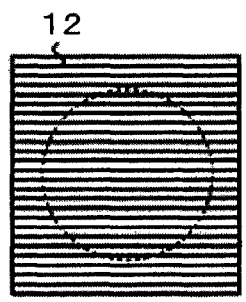
Figure 8B:
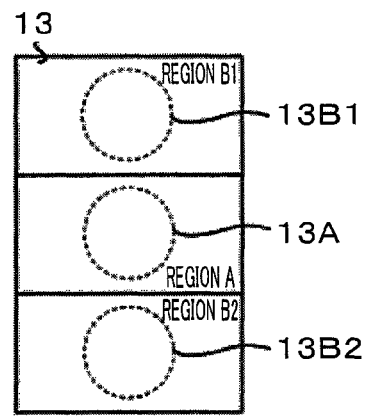
Figure 8C:
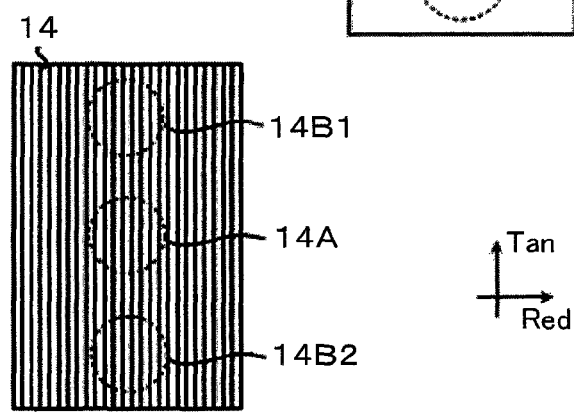

FIG. 8A to FIG. 8C are diagrams illustrating constitutional components of the phase difference forming unit 20 according to the embodiment 2, in which FIG. 8A illustrates the grating 12, FIG. 8B illustrates the divided wave plate and FIG. 8C illustrates the polarization grating 14. In FIG. 8A to FIG. 8C, a dotted line indicates the outline of a light beam.

First, a light beam that has been incident on the grating 12 is separated into three light beams. Thus, diffraction efficiencies of the grating 12 for 0-order diffracted light, +first-order diffracted light and −first-order diffracted light are set to the rate of, for example, 1:2:1. However, the rate of the diffraction efficiencies is not limited to the above and may be 1:1:1 or may have any other value. The three light beams (0-order light, +first-order light and −first-order light) outgoing from the grating 12 are incident on the divided wave plate 13.

The divided wave plate 13 is segmented into three regions A, B1 and B2 and three light beams, that is, 0-order light 13A, +first-order light 13B1 and −first-order light 13B2 are respectively incident on the regions A, B1 and B2. The region A includes a half wave plate and the regions B1 and B2 respectively include quarter wave plates. The polarization direction of the light beam 13A that has been incident on the region A is rotated by 45 degrees by the half wave plate. A phase difference is afforded to the light beam 13B1 that has been incident on the region B1 by the quarter wave plate. Likewise, a phase difference is afforded to the light beam 13B2 that has been incident on the region B2 by the quarter wave plate. The three light beams that have transmitted through the divided wave plate 13 are incident on the polarization grating 14.

Three light beams 14A, 14B1 and 14B2 sent from the divided wave plate 13 are incident on the polarization grating 14. Signal light and reference light are included in each of the light beams 14A, 14B1 and 14B2. Here, it is assumed that diffraction action occurs, for example, only when s-polarized light is incident on the polarization grating 14 and then diffraction efficiencies of the polarization grating 14 for 0-order diffracted light, +first-order diffracted light and −first-order diffracted light are set to the rate of, for example, 0:1:0. Thus, when p-polarized light and s-polarized light are incident on the polarization grating 14, the p-polarized light is obtained as transmitted light and the s-polarized light is obtained as +first-order light. As a result, each of the light beams 14A, 14B1 and 14B2 is separated into two mutually orthogonal linearly polarized light beams and six light beams in all are outgoing. In the above mentioned situation, four phase differences, that is, 0° 90°, 180° and 270° phase differences are produced between the signal light and the reference light in the respective light beams. The six light beams are incident on the detector 10A.

Figure 9:
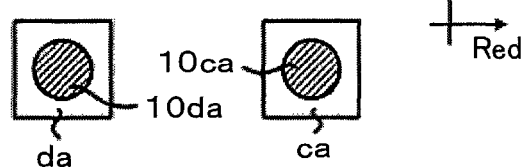
FIG. 9 is a diagram illustrating a configuration of the detector 10A according to the embodiment 2.
Figure 9:
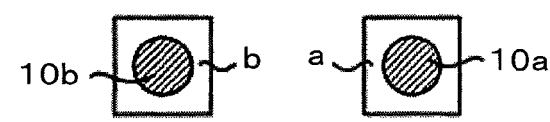
Figure 9:
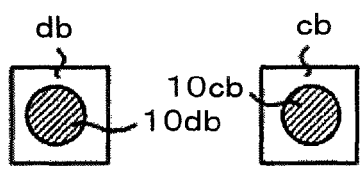

FIG. 9 is a diagram illustrating a configuration of the detector 10A in the embodiment 2. The detector 10A includes six light receiving parts a, b, ca, da, cb and db. Two mutually orthogonal linearly polarized light beams 10ca and 10da that have been separated from the light beam 14A by the polarization grating 14 are incident on the light receiving parts a and b of the detector 10A. Two mutually orthogonal linearly polarized light beams 10ca and 10da that have been separated from the light beam 14B1 by the polarization grating 14 are incident on the light receiving parts ca and da of the detector 10A. Two mutually orthogonal linearly polarized light beams 10cb and 10 db that have been separated from the light beam 14B2 by the polarization grating 14 are incident on the light receiving parts cb and db of the detector 10A. In the above mentioned case, p-polarized light that has transmitted through the polarization grating 14 is incident on the light receiving parts a, ca, and cb and s-polarized light which is +first-order diffracted light of the polarization grating 14 is incident on the light receiving parts b, da and db.

Here, interference occurs in the light beam 10a on the detector 10A with a 0° phase difference between the reference light and the signal light and interference occurs in the light beam 10b with a 180° phase difference between the reference light and the signal light. Interference occurs in the light beams 10ca and 10cb with a 90° phase difference between the reference light and the signal light and interference occurs in the light beams 10da and 10 db with a 270° phase difference between the reference light and the signal light. Therefore, when Es is the electric field vector of the signal light and Er is the electric field vector of the reference light, signals A, B, CA, CB, DA and DB obtained from the light receiving parts a, b, ca, cb, da and db on the detector 10A are expressed by the following formulae.

[Numerical Formulae 6]

$$A = \left| \frac{1}{2}Es + \frac{1}{2}Er \right|^2$$
$$= \frac{1}{4}|Es|^2 + \frac{1}{4}|Er|^2 + \frac{1}{2}|Es||Er|\cos(\theta s - \theta r)$$

$$B = \left| \frac{1}{2}Es - \frac{1}{2}Er \right|^2$$
$$= \frac{1}{4}|Es|^2 + \frac{1}{4}|Er|^2 - \frac{1}{2}|Es||Er|\cos(\theta s - \theta r)$$

$$CA = CB$$
$$= \frac{1}{16}|(1-i)Es + (1+i)Er|^2$$
$$= \frac{1}{8}|Es^2| + \frac{1}{8}|Er^2| + \frac{1}{4}|Es||Er|\sin(\theta s - \theta r)$$

$$DA = DB$$
$$= \frac{1}{16}|(1+i)Es + (1-i)Er|^2$$
$$= \frac{1}{8}|Es^2| + \frac{1}{8}|Er^2| - \frac{1}{4}|Es||Er|\sin(\theta s - \theta r)$$

In the formulae, ($\theta s - \theta r$) indicates the phase difference between the electric field vector Es of the signal light and the electric field vector Er of the reference light. Here, differential signals between the signal A and the signal B and between a signal (CA+CB) and a signal (DA+DB) are arithmetically operated as expressed by the following formulae.

[Numerical Formulae 7]

$$A - B = |Es||Er|\cos(\theta s - \theta r) \quad (3)$$

$$(CA + CB) - (DA + DB) = |Es||Er|\sin(\theta s - \theta r) \quad (4)$$

Here, the reproduction signal (RF) of the embodiment 2 is generated by arithmetically operating a square root of sum of squares of the formulae (3) and (4).

[Numerical Formula 8]

$$RF = \sqrt{(A-B)^2 + \{(CA+CB) - (DA+DB)\}^2}$$
$$= |Es||Er|$$

The reproduction signal RF is expressed by the formula which is the same as the formula 3 in the embodiment 1 as apparent from the above formula and the amplification factor Am of the reproduction signal is also obtained from the formula 4 in the embodiment 1. Since the grating 12 according to the embodiment 2 has a simple rectangular grating structure, it has such a characteristic that it is manufactured more readily than the grating according to the embodiment 1.

According to the embodiment 2, the effect of amplifying the amplitude of the reproduction signal is also obtained by using one detector 10A by combining the grating 12, the divided wavelength plate 13 and the polarization grating 14 with one another. As a result, it is allowed to reduce the number of components to greatly reduce the size of the optical system as compared with a conventional system.

Embodiment 3

In the optical system according to an embodiment 3, a reproduction signal is generated by separating a light beam including signal light and reference light into six light beams. The embodiment 3 is different from the embodiment 2 in optical characteristics of the phase different forming unit 20 (including the grating 12, the divided wave plate 13 and the polarization grating 14) and arrangement of light receiving parts on the detector 10A.

In the embodiment 3, a light beam reflected by the polarized beam splitter 58 is separated into two light beams by the grating 12. The two light beams transmit through two regions of the divided wave plate 13 and are separated into six light beams by the polarization grating 14. The six light beams are respectively detected by six light receiving parts disposed on the detector 10A and a reproduction signal is generated on the basis of detection signals from the six light receiving parts.

Figure 10A:
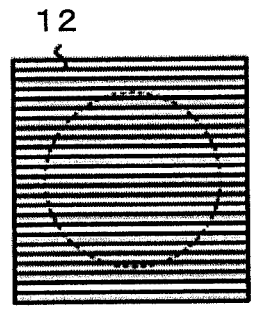
Figure 10B:
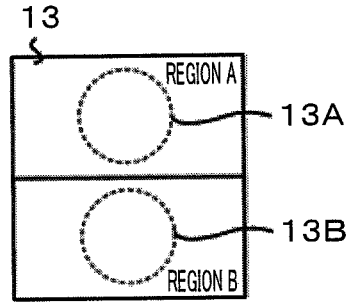
Figure 10C:
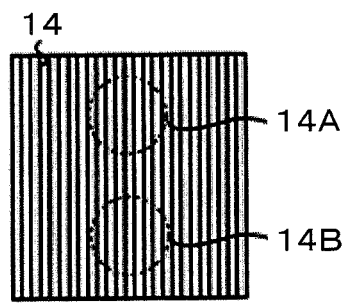
Figure 10C:
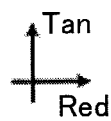

FIG. 10A to FIG. 10C are diagrams illustrating constitutional components of the phase difference forming unit 20 in the embodiment 3, in which FIG. 10A illustrates the grating 12, FIG. 10B illustrates the divided wave plate 13 and FIG. 10O illustrates the polarization grating 14. In FIG. 10A to FIG. 10O, a dotted line indicates the outline of a light beam.

A light beam that has been incident on the grating 12 is separated into two light beams. Thus, diffraction efficiencies of the grating 12 for 0-order diffracted light, +first-order diffracted light and −first-order diffracted light attained are set to the rate of, for example, 0:1:1. However, the rate of the diffraction efficiencies is not limited to the above and may be 1:1:0 or may have any other value. The two light beams (+first-order light and −first-order light) that have been outgoing from the grating 12 are incident on the divided wave plate 13.

The divided wave plate 13 is segmented into two regions A and B and the two light beams, that is, +first-order light 13A and −first-order light 13B are respectively incident on the regions A and B. The region A includes a half wave plate and the region B includes a quarter wave plate. The polarization direction of the light beam 13A that has been incident on the region A is rotated by 45 degrees by the half wave plate. A phase difference is afforded to the light beam 13B that has been incident on the region B by the quarter wave plate. The two light beams that have transmitted through the divided wave plate 13 are incident on the polarization grating 14.

Two light beams 14A and 14B sent from the divided wave plate 13 are incident on the polarization grating 14. Here, it is assumed that diffraction action occurs, for example, only when s-polarized light is incident on the polarization grating 14 and then diffraction efficiencies of the polarization grating 14 for 0-order diffracted light, +first-order diffracted light and −first-order diffracted light are set to the rate of, for example, 0:1:0. Therefore, when p-polarized light and s-polarized light are incident on the polarization grating 14, the p-polarized light is obtained as transmitted light and the s-polarized light is obtained as +first-order light and −first-order light. As a result, each of the light beams 14A and 14B is separated into three mutually orthogonal linearly polarized light beams and six light beams in all are outgoing. In the above mentioned situation, four phase differences, that is, 0° 90°, 180° and 270° phase differences are produced between signal light and reference light in the light beams. The six light beams are incident on the detector 10A.

Figure 11:
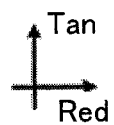
FIG. 11 is a diagram illustrating a configuration of the detector 10A according to the embodiment 3.
Figure 11:
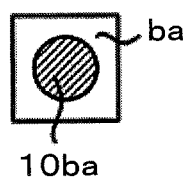
Figure 11:
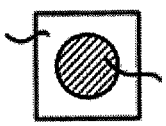
Figure 11:
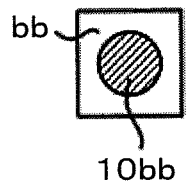
Figure 11:
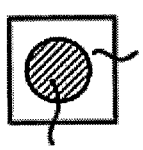
Figure 11:
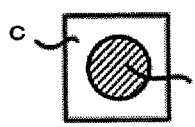
Figure 11:
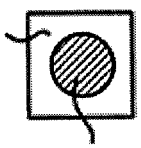

FIG. 11 is a diagram illustrating a configuration of the detector 10A in the embodiment 3. The detector 10A includes six light receiving parts a, ba, bb, c, da and db.

Three mutually orthogonal linearly polarized light beams 10a, 10ba and 10bb that have been separated from the light beam 14A by the polarization grating 14 are incident on the light receiving parts a, ba and bb of the detector 10A. Three mutually orthogonal linearly polarized light beams 10c, 10da and 10db that have been separated from the light beam 14B by the polarization grating 14 are incident on the light receiving parts c, da and db of the detector 10A. In the above mentioned case, p-polarized light that has transmitted through the polarization grating 14 is incident on the light receiving parts a and c, s-polarized light which is the +first-order diffracted light of the polarization grating 14 is incident on the light receiving parts ba and da, and S-polarized light which is the −first-order diffracted light of the polarization grating 14 is incident on the light receiving parts bb and db.

Here, interference occurs in the light beam 10a on the detector 10A with a 0° phase difference between the reference light and the signal light and interference occurs in the light beams 10ba and 10bb with a 180° phase difference between the reference light and the signal light. Interference occurs in the light beam 10c on the detector 10A with a 90° phase difference between the reference light and the signal light and interference occurs in the light beams 10da and 10 db with a 270° phase difference between the reference light and the signal light. Therefore, when Es is the electric field vector of the signal light and Er is the electric field vector of the reference light, signals A, BA, BB, C, DA and DB obtained from the light receiving parts a, ba, bb, c, da and db on the detector 10A are expressed by the following formulae.

[Numerical Formulae 9]

$$A = \left|\frac{1}{2}Es + \frac{1}{2}Er\right|^2$$

$$= \frac{1}{4}|Es|^2 + \frac{1}{4}|Er|^2 + \frac{1}{2}|Es||Er|\cos(\theta s - \theta r)$$

$$BA = BB$$

$$= \frac{1}{2}\left|\frac{1}{2}Es - \frac{1}{2}Er\right|^2$$

$$= \frac{1}{8}|Es|^2 + \frac{1}{8}|Er|^2 - \frac{1}{4}|Es||Er|\cos(\theta s - \theta r)$$

$$C = \frac{1}{8}|(1-i)Es + (1+i)Er|^2$$

$$= \frac{1}{4}|Es^2| + \frac{1}{4}|Er^2| + \frac{1}{2}|Es||Er|\sin(\theta s - \theta r)$$

$$DA = DB$$

$$= \frac{1}{16}|(1+i)Es + (1-i)Er|^2$$

$$= \frac{1}{8}|Es^2| + \frac{1}{8}|Er^2| - \frac{1}{4}|Es||Er|\sin(\theta s - \theta r)$$

In the formulae, (θs−θr) indicates the phase difference between the electric field vector Es of the signal light and the electric field vector Er of the reference light. Here, differential signals between the signals A and (BA+BB) and between the signals C and (DA+DB) are arithmetically operated as expressed by the following formulae.

[Numerical Formulae 10]

$$A-(BA+BB)=|Es||Er|\cos(\theta s-\theta r) \quad (5)$$

$$C-(DA+DB)=|Es||Er|\sin(\theta s-\theta r) \quad (6)$$

Here, the reproduction signal (RF) of the embodiment 3 is generated by arithmetically operating a square root of sum of squares of the formulae (5) and (6).

[Numerical Formula 11]

$$RF = \sqrt{\{A-(BA+BB)\}^2 + \{C-(DA+DB)\}^2}$$

$$= |Es||Er|$$

The reproduction signal RF is expressed by the formula which is the same as the formula 3 in the embodiment 1 as apparent from the above formula and the amplification factor Am of the reproduction signal is also obtained from the same formula as the formula 4 in the embodiment 1. Since the polarization grating 14 according to the embodiment 3 has a simple rectangular grating structure, it has such a characteristic that it is manufactured more readily than the grating according to the embodiment 1.

According to the embodiment 3, the effect of amplifying the amplitude of the reproduction signal is also obtained by using one detector 10A by combining the grating 12, the divided wave plate 13 and the polarization grating 14 with one another. As a result, it is allowed to reduce the number of components to greatly reduce the size of the optical system as compared with a conventional system.

Embodiment 4

In the embodiment 1, the reproduction signal and the servo signals (the focusing error signal and the tracking error signal) are generated from detection signals from separate detectors. On the other hand, an embodiment 4 is configured such that these signals are generated from detection signals from one common detector.

Figure 12:
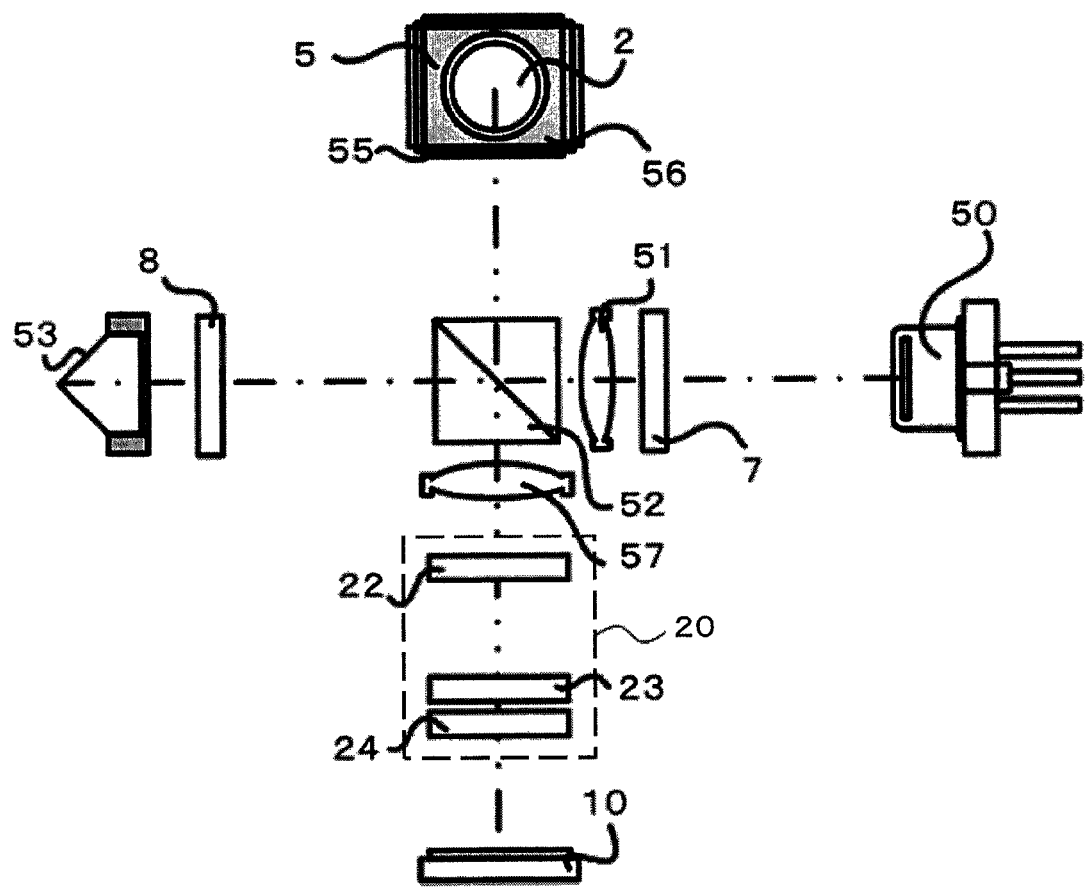
FIG. 12 is a diagram illustrating the optical system of the optical pickup device according to an embodiment 4.

FIG. 12 is a diagram illustrating an optical system of an optical pickup device according to the embodiment 4 of the present invention. The embodiment 4 is different from the embodiment 1 (FIG. 1) in configuration of constitutional components ranging from the polarized beam splitter 52 to a detector 10.

A light beam that has been outgoing from the polarized beam splitter 52 is incident on the phase difference forming unit 20 through the detecting lens 57. The light beam is separated into three light beams by the grating 22 in the phase difference forming unit 20. The three separated light beams transmit through three regions of the divided wave plate 23 and are separated into a plurality of light beams by the polarization grating 24. The plurality of light beams is separately detected by a plurality of light receiving parts disposed on the detector 10. A reproduction signal and servo signals (a focusing error signal and a tracking error signal) are generated on the basis of detection signals from these light receiving parts. The actuator 5 on which the objective lens 2 is loaded is driven in an optical axis direction with the focusing error signal to control focusing. In the above mentioned case, the cube corner reflector 53 may be also driven in the optical axis direction with the focusing error signal in order to generate a stable reproduction signal on the basis of the detection signals from the detector 10.

Next, configurations and operations of the phase difference forming unit 20 and the detector 10 will be described in detail.

Figure 13A:
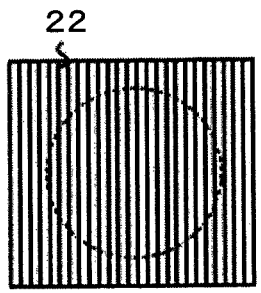
Figure 13B:
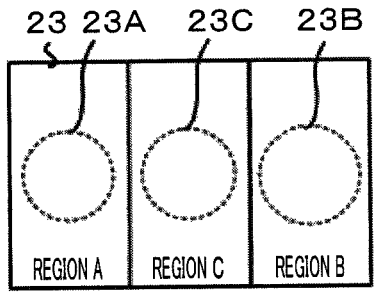
Figure 13C:
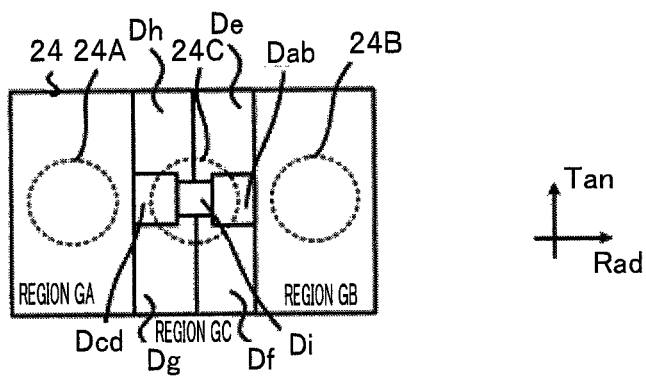

FIG. 13A to FIG. 13C are diagrams illustrating constitutional components of the phase difference forming unit 20, in which FIG. 13A illustrates the grating 22, FIG. 13B illustrates the divided wavelength plate 23 and FIG. 13C illustrates the polarization grating 24. In FIG. 13A to FIG. 13C, a dotted line indicates the outline of a light beam.

First, a light beam which has been incident on the grating 22 is separated into three light beams. Thus, diffraction efficiencies of the grating 22 for 0-order diffracted light, +first-order diffracted light and −first-order diffracted light are set to the rate of, for example, 1:1:1. However the rate of the diffraction efficiencies is not limited to the above and may have any other value. The grating 22 is in the form of a hologram element and defocus aberrations occurring in opposite directions are afforded to ±first-order light to be diffracted. The three light beams (0-order light, +first-order light and −first-order light) that have been outgoing from the grating 22 are incident on the divided wave plate 23.

The divided wave plate 23 is segmented into three regions A, B and C and three light beams, that is, +first-order light 23A, −first-order light 23B and 0-order light 23C are respectively incident on the regions A, B and C. The region A includes a half wave plate, the region B includes a quarter wave plate and the region C includes a half wave plate. The polarization direction of the light beam 23A that has been incident on the region A is rotated by 45 degrees by the half wave plate. A phase difference is afforded to the light beam 23B that has been incident on the region B by the quarter wave plate. The polarization direction of the light beam 23C that has been incident on the region C is rotated by 90 degrees by the half wave plate. S-polarized light is obtained as signal light and p-polarized light is obtained as reference light. The three light beams that have transmitted through the divided wave plate 23 are incident on the polarization grating 24.

The polarization grating 24 is segmented into grating regions GA, GB and GC. In these regions, the region GC includes regions Da, Df, Dg and Dh (a region X) on which only 0-order diffracted light in disc diffracted light that has been diffracted by tracks on a disc is incident, regions Dab and Dcd (a region Y) on which the 0-order diffracted light and ±first-order diffracted light in the disc diffracted light are incident and a region Di (a region Z) including an almost central part of the 0-order diffracted light. Light beams 24A, 24B and 24C that have been outgoing from the regions A, B and C of the divided wave plate 23 are respectively incident on the regions GA, GB and GC. It is assumed that diffraction action occurs only when, for example, s-polarized light is incident on the polarization grating 24 and then diffraction efficiencies of the regions GA and GB for 0-order diffracted light, +first-order diffracted light and −first-order diffracted light are set to the rate of, for example, 0:1:0 and diffraction efficiencies of the region GC for 0-order diffracted light, +first-order diffracted light and −first-order diffracted light through the region GC are set to the rate of, for example, 0:1:1. Thus, when p-polarized light and s-polarized light are incident on the regions GA and GB, the p-polarized light is obtained as transmitted light and the s-polarized light is obtained as +first-order light in these regions and hence each light beam is separated into two mutually orthogonal linearly polarized light beams. In each region included in the region GC, each light beam is separated into mutually orthogonal linearly polarized light beams. Respective light beams so separated by the polarization grating 24 are incident on the detector 10.

Figure 14:
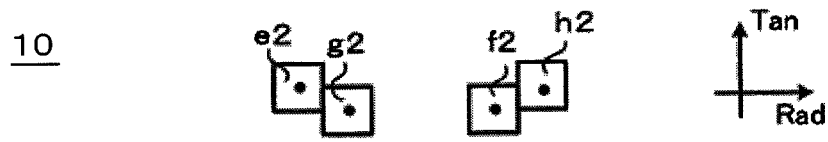
FIG. 14 is a diagram illustrating arrangement of the light receiving parts on the detector 10 in FIG. 12.
Figure 14:
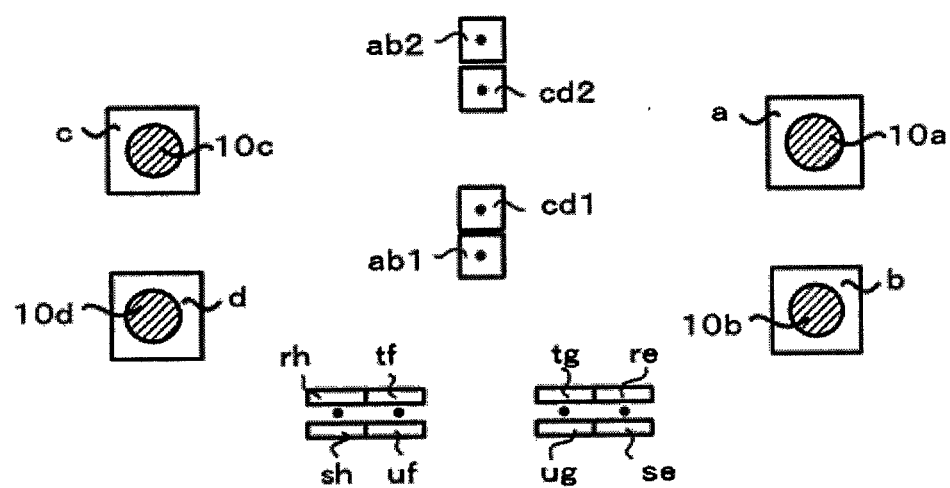

FIG. 14 is a diagram illustrating arrangement of light receiving parts on the detector 10 in the embodiment 4. In FIG. 14, a black point and a shaded region indicate signal light.

Light beams 10a, 10b, 10c and 10d that have been outgoing from the regions GA and GB of the polarization grating 24 are incident on the light receiving parts a, b, c and d for reproduction signal detection. In the light beams that have been outgoing from the region GA, the transmitted component (p-polarized light) 10a is incident on the light receiving part a and the +first-order diffracted light (s-polarized light) 10b is incident on the light receiving part b. In the light beams that have been outgoing from the region GB, the transmitted component (p-polarized light) 10c is incident on the light receiving part c and the +first-order light (s-polarized light) 10d is incident on the light receiving part d. These light beams 10a, 10b, 10c and 10d blur on detection parts (light receiving surfaces) under the influence of defocus aberration afforded by the grating 22.

Light beams that have been outgoing from the region GC of the polarization grating 24 are incident on the remaining light receiving parts for servo signal detection. +first-order light diffracted through the regions De, Df, Dg and Dh of the polarization grating 24 is incident on light receiving parts re, se, tf, uf, tg, ug, rh and sh for focusing error signal detection. +first-order light diffracted through the regions Dab and Dcd of the polarization grating 24 is incident on light receiving parts ab1 and cd1 for tracking error signal detection. −first-order light diffracted through the regions Dab and Dcd is incident on light receiving parts ab2 and cd2 for tracking error signal detection. −first-order light diffracted through the regions De, Df, Dg and Dh is incident on light receiving parts e2, f2, g2 and h2 for tracking error signal detection.

A focusing error signal (FES), a tracking error signal (TES) and a reproduction signal (RF) are generated by arithmetically operating the following formulae wherein signals obtained from the respective light receiving parts a, b, c, d, ab1, cd1, re, se, tf, uf, tg, ug, rh, sh, ab2, cd2, e2, f2, g2 and h2 are designated by A, B, C, D, AB1, CD1, RE, SE, TF, UF, TG, UG, RH, SH, AB2, CD2, E2, F2, G2 and H2.

$$FES=(SE+TG+TF+SH)-(RE+UG+UF+RH)$$

$$TES=\{(AB1+AB2)-(CD1+CD2)\}-kt\{(E2+F2)-(G2+H2)\}$$

$$RF=\sqrt{(A-B)^2+(C-D)^2} \quad \text{[Numerical Formulae 12]}$$

In the formulae, kt is a coefficient for avoiding generation of a DC component in a tracking error signal when an objective lens is displaced. Here, a knife-edge system is used as a focusing error signal detecting system. Since the knife-edge system is well known, description thereof will be omitted. In the formulae, since the signals AB1 and CD1 are components which are the same as the signals AB2 and CD2, these signals may be omitted in arithmetical operation or may be detected by the light receiving parts (ab2 and cd2) disposed on one side by setting diffraction efficiencies of the regions Dab and Dcd of the polarization grating 24 for 0-order diffracted light, +first-order diffracted light and −first-order diffracted light through the regions Dab and Dcd to the rate of, for example, 0:0:1.

Here, the reproduction signal (RF) obtained in the embodiment 4 is the same as that obtained from the formula 3 in the embodiment 1 and the same effect of amplifying the amplitude of the reproduction signal as that obtained by the embodiment 1 is obtained by the embodiment 4. In addition, the same effect as that obtained from the formulae 5 in the embodiment 1 is also obtained with respect to the servo signals (the focusing error signal FES and the tracking error signal TES). In the embodiment 4, it is allowed to obtain both the reproduction signal and the servo signals from detection signals from one detector by disposing the grating 22, the divided wave plate 23 and the polarization grating 24 in converged light and segmenting each of the divided wave plate 23 and the polarization plating 24 into three regions in the embodiment 4 and hence noticeable downsizing of the optical system is allowed.

The embodiment 4 is characterized in that one light beam is separated into three light beams by the grating 22, the two light beams diffracted through the grating 22 are used to generate the reproduction signal and one light beam diffracted through the grating 22 is used to generate the servo signals. Thus, the same effect is obtained by combining the embodiment 4 with a tracking error signal detection system using one light beam. In addition, the same effect is also obtained by disposing a grating on the outward path and using a three-beam Differential-Push-Pull (DPP) system.

In the embodiment 4, the defocus aberration is afforded to the light beams by the grating 22 in order to cope with misalignment between signal light and reference light on the light receiving parts a, b, c and d. The reason lies in that since positions where the signal light and the reference light diverge do not match each other when misalignment in optical axis occurs between the signal light and the reference light owing to out-of-adjustment, it may become rather possible to increase an interference region by blurring the light on the light receiving parts. Thus, a method of blurring light on a disc is not limited to a method using the defocus aberration and an aberration other than the defocus aberration may be afforded or defocusing may be physically exerted. In addition, a configuration that defocus aberration is afforded by the polarization grating 24 may be adopted.

Although the reproduction signal is detected by four light receiving parts in the embodiment 4, signal detection is not limited to the above and the reproduction signal may be detected by setting the diffraction efficiencies with which the grating 24 diffracts the 0-order diffracted light, the +first-order diffracted light and the −first-order diffracted light through the regions GA and GB to the rate of, for example, 0:1:1 and disposing light receiving parts corresponding to the above on the detector.

In addition, although description has been made in relation to a configuration that the reference light transmits through the region GC of the polarization grating 24, a divided polarizer may be disposed between the polarization grating 24 and the detector 10 so as to avoid incidence of undesirable light beams to light-shield a reference light component in the region GC. A photonic crystal or the like may be used as the divided polarizer.

Embodiment 5

Although the embodiment 4 is configured that the reproduction signal and the servo signals (the focusing error signal and the tracking error signal) are generated from the detection signals from one common detector, an embodiment 5 is configured that the optical characteristics of the phase difference forming unit 20 are partially changed and a detecting lens for making a light beam astigmatic is added.

Figure 15:
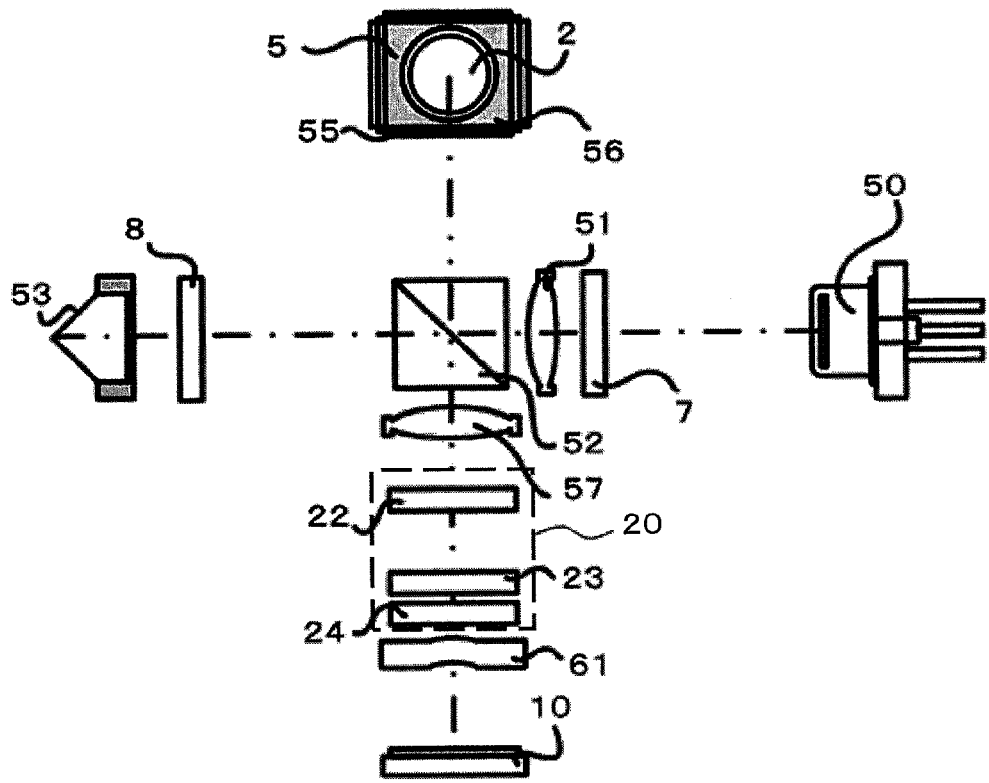
FIG. 15 is a diagram illustrating the optical system of the optical pickup device according to an embodiment 5.

FIG. 15 is a diagram illustrating an optical system of an optical pickup device according to the embodiment 5 of the present invention. The embodiment 5 is different from the embodiment 4 (FIG. 12) in configuration of constitutional components of the optical system ranging from the phase difference forming unit 20 to the detector 10.

A light beam that has been outgoing out from the polarized beam splitter 52 is incident on the phase difference forming unit 20 through the detecting lens 57. In the phase difference forming unit 20, the light beam is separated into three light beams by the grating 22, the three light beams transmit through three regions of the divided wave plate 23 and are separated into a plurality of light beams by the polarization grating 24. Then, only predetermined beams are made astigmatic by a detecting lens 61 which is additionally disposed and the astigmatic beams are separately detected by a plurality of light receiving parts disposed on the detector 10. A reproduction signal and servo signals (a focusing error signal and a tracking effort signal) are generated on the basis of detection signals obtained from these light receiving parts.

In the embodiment 5, although the phase difference forming unit 20 (including the grating 22, the divided wave plate 23 and the polarization grating 24) is the same as that in the embodiment 4 (FIG. 13 A to FIG. 13C) in form, the optical characteristics are partially different from those in the embodiment 4.

First, a light beam that has been incident on the grating 22 is separated into three light beams. Here, it is assumed that diffraction efficiencies of the grating 22 for 0-order diffracted light, +first-order diffracted light and −first-order diffracted light are set to the rate of, for example, 1:1:1. In the above mentioned situation, the three light beams diffracted through the grating 22 are incident on the divided wave plate 23.

The divided wave plate 23 is segmented into regions A, B and C, the region A includes a half wave plate, the region B includes a quarter wave plate and the region C includes a half wave plate. The polarization direction of a light beam 23A that has been incident on the region A is rotated by 45 degrees by the half wave plate. A phase difference is afforded to a light beam 23B that has been incident on the region B by the quarter wave plate. The polarization direction of a light beam 2C that has been incident on the region C is rotated by a predetermined angle by the half wave plate. Here, it is assumed that the rate of s-polarized light of signal light to p-polarized light of reference light is 1:1. In the above mentioned situation, the three light beams that have transmitted through the divided wave plate 23 are incident on the polarization grating 24.

The polarization grating 24 is segmented into grating regions GA, GB and GC. The region GC is further segmented into several regions depending on the kinds (0-order light and ±first-order light) of light included in incident disc diffracted light. It is assumed that diffracting action occurs in the polarization grating 24 only when, for example, s-polarized light is incident on the polarization grating 24 and then diffraction efficiencies of the regions GA, GB and GC for 0-order diffracted light, +first-order diffracted light and −first-order diffracted light through the regions GA, GB and GC are set to the rate of 0:1:0. Thus, when p-polarized light and s-polarized light are incident on the respective regions GA, GB and GC, the p-polarized light is obtained as transmitted light and the s-polarized light is obtained as first-order light and hence each light beam is separated into two mutually orthogonal linearly polarized light beams. The respective light beams separated by the polarization grating 24 are incident on a detecting lens 61.

A central part of the detecting lens 61 is configured as a lens region that makes a light beam that has transmitted through it astigmatic. An outer peripheral part of the detecting lens 61 is configured as a collimated flat-plate region.

Figure 16:
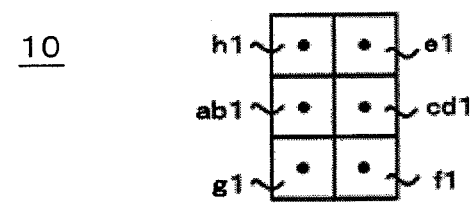
FIG. 16 is a diagram illustrating arrangement of the light receiving parts on the detector 10 in FIG. 15.
Figure 16:
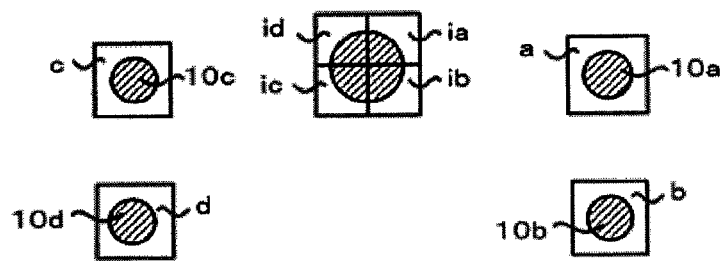

FIG. 16 is a diagram illustrating arrangement of light receiving parts on the detector 10 in the embodiment 5. In FIG. 16, a black point and a shaded region indicate signal light.

Light beams 10a, 10b, 10c and 10d that have been outgoing from the regions GA and GB of the polarization grating 24 are incident on light receiving parts a, b, and d for reproduction signal detection through the collimated flat-plate region of the detecting lens 61. In the light beams that have been outgoing from the region GA, the transmitted component (the p-polarized light) 10a is incident on the light receiving part a and the +first-order diffracted light (the s-polarized light) 10b is incident on the light receiving part b. In the light beams that have been outgoing from the region GB, the transmitted component (the p-polarized light) 10c is incident on the light receiving part c and the +first-order diffracted light (the s-polarized light) 10d is incident on the light receiving part d. These light beams 10a, 10b, 10c and 10d blur on detection parts under the influence of the defocus aberration afforded by the grating 22.

Light beams that have been outgoing from respective regions in the region GC of the polarization grating 24 are incident on the remaining light receiving parts for servo signal detection through the detecting lens 61. In the above mentioned case, the p-polarized light components are made astigmatic in the lens region of the detecting lens 61 and are incident on light receiving parts ia to id for focusing error signal detection. The s-polarized light components transmit through the collimated flat-plate region of the detecting lens 61 and are incident on light receiving parts ab1, cd1, e1, f1, g1 and h1 for tracking error signal detection. In these light components, the +first-order light components diffracted through regions Dab and Dcd in the region GC are incident on the light receiving parts ab1 and cd1 and the +first-order light components diffracted through regions De, Df, Dg and Dh are incident on the light receiving parts e1, f1, g1 and h1.

It is assumed that signals obtained from the light receiving parts a, b, c, d, ia, ib, ic, id, ab1, cd1, e1, f1, g1 and h1 are designated by A, B, C, D, IA, IB, IC, ID, AB1, CD1, E1, F1, G1 and H1. Then, the focusing error signal (FES), the tracking error signal (TES) and the reproduction signal (RF) are generated by arithmetically operating the following formulae.

$$FES = (IA+IC)-(IB+ID)$$

$$TES = (AB1-CD1)-kt\{(E1+F1)-(G1+H1)\}$$

$$RF = \sqrt{(A-B)^2+(C-D)^2}$$ [Numerical Formulae 13]

In the formulae, kt is a coefficient for avoiding generation of a DC component in the tracking error signal when an objective lens is displaced. Here, although an astigmatic system is used as a focusing error signal detection system, this system is well known and hence description thereof will be omitted.

Here, the reproduction signal (RF) obtained in the embodiment 5 is generated by arithmetically operating the numerical formula which is the same as the numerical formula 3 in the embodiment 1 and the same signal amplitude amplifying effect as that in the embodiment 1 is obtained. Also in the embodiment 5, it is allowed to obtain both the reproduction signal and the servo signals from the detection signals from one detector by disposing the grating 22, the divided wave plate 23 and the polarization grating 24 in converged light and segmenting each of the divided wave plate 23 and the polarization grating 24 into three regions and hence noticeable downsizing is allowed as compared with a conventional system. Although the embodiment 5 is configured that the diffracted light on the diffraction grating region GA, the diffracted light on the region GB and the +first-order diffracted light on the region GC transmit through the collimated flat-plate region of the detecting lens, the configuration is not limited to the above and such a configuration may be adopted that, for example, a hologram element is used as the grating to cause astigmatism to occur by the hologram element so as to suppress astigmatism occurring in the detecting lens 61.

Embodiment 6

In an embodiment 6, an optical disc apparatus on which an optical pickup device 170 according to the embodiments 1 to 5 is loaded will be described.

Figure 17:
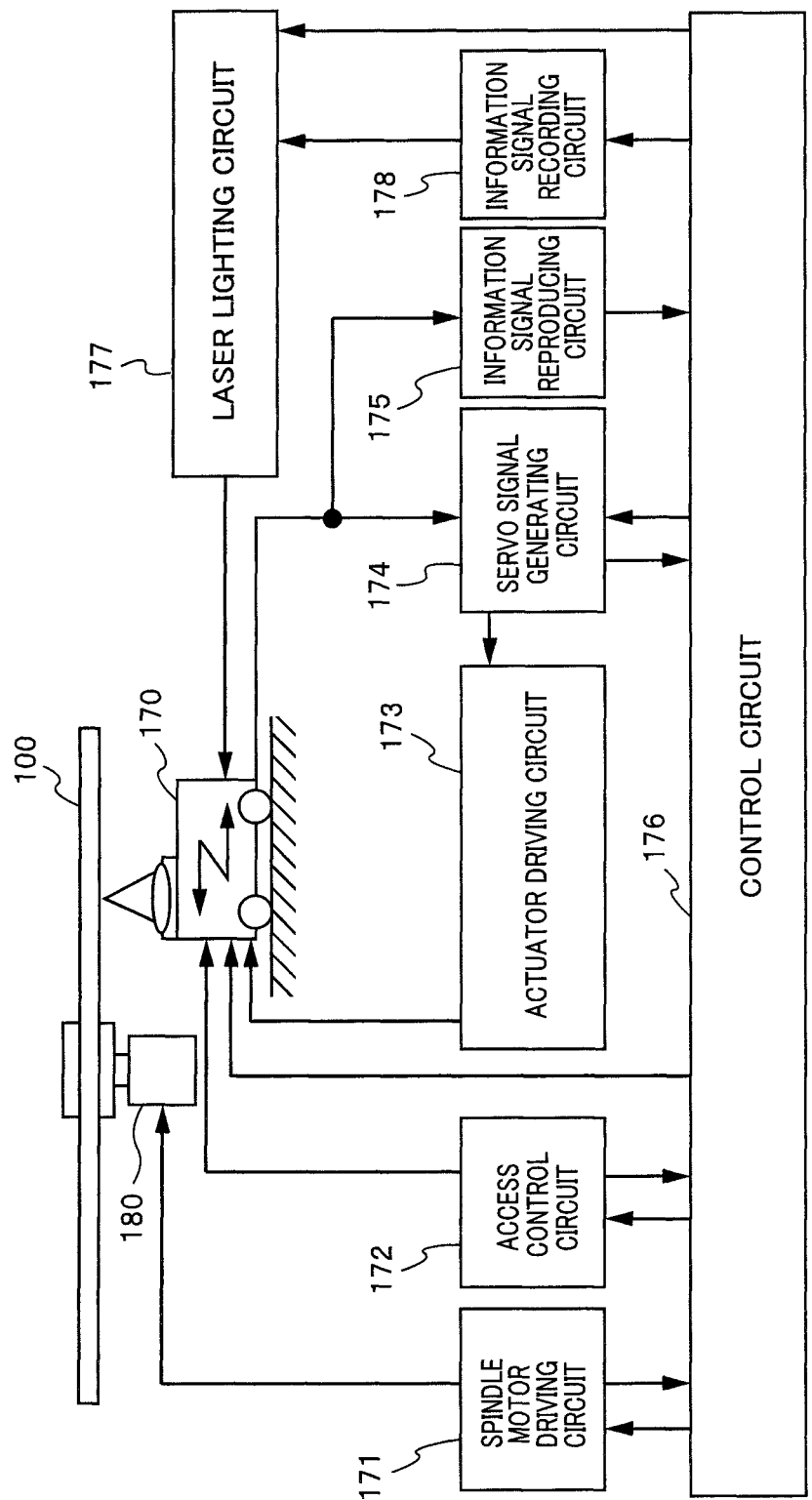
FIG. 17 is a diagram illustrating a schematic configuration of an optical disc apparatus according to an embodiment 6.

FIG. 17 is a diagram illustrating a schematic configuration of the optical disc apparatus according to the embodiment 6. The optical pickup device 170 has a configuration according to any one of the embodiments 1 to 6. The optical pickup device 170 includes a mechanism that drives in the disc radial direction Rad of an optical disc 100 and the position of which is controlled in accordance with an access control signal from an access control circuit 172.

A laser lighting circuit 177 supplies a predetermined laser drive current to a laser diode in the optical pickup device 170 and a predetermined quantity of laser light is emitted from the laser diode depending on whether information is to be recorded or reproduced. The laser lighting circuit 177 may be incorporated into the optical pickup device 170.

In information reproduction, a signal output from the detector 10 in the optical pickup device 170 is sent to a servo signal generating circuit 174 and an information signal reproducing circuit 175. In the servo signal generating circuit 174, servo signals such as a focusing error signal, a tracking error signal, a tilt control signal and the like are generated on the basis of detection signals from the detector 10 and an actuator in the optical pickup device 170 is driven via an actuator driving circuit 173 on the basis of the generated servo signals to control the position of an objective lens. In the information signal reproducing circuit 173, a reproduction signal for information recorded in the optical disc 100 is generated on the basis of the detection signals from the detector 10.

In information recording, an information signal recording circuit 178 generates a recording control signal on the basis of information received from a control circuit 176 and controls the laser lighting circuit 177 to write desired information into the optical disc 100.

Some of the signals obtained from the servo signal generating circuit 174 and the information signal reproducing circuit 175 are sent to the control circuit 176. A spindle motor driving circuit 171, the access control circuit 172, the servo signal generating circuit 174, the laser lighting circuit 177 and the like are connected to the control circuit 176 to perform rotational control of a spindle motor 180 for rotating the optical disc 100, control of an access direction and an access position, servo control of the objective lens, control of the quantity of light emitted from the laser diode in the optical pickup device 170 and the like.

An optical disc apparatus having only an information reproducing function may be obtained by eliminating the information signal recording circuit 178 from the above configuration.

Since the optical pickup device according to any one of the embodiments 1 to 5 is loaded on the optical disc apparatus according to the embodiment 6, it is allowed to increase the S/N ratio of a reproduction signal and to promote downsizing of the optical pickup device and the optical disc apparatus.

Although various embodiments of the present invention have been described above, the present invention is not limited to these embodiments and includes various altered embodiments. For example, details of the embodiments have been described for ready understanding of the present invention and the present invention is not necessarily limited to embodiments including all the configurations described above. In addition, another configuration of another embodiment may be added to one configuration of one embodiment. Further, another configuration may be added to, eliminated from and/or replaced with a part of one configuration in each embodiment.

What is claimed is:

1. An optical pickup device that irradiates an optical disc with laser light and detects light reflected from the optical disc, comprising:
    a laser diode which emits a light beam of laser light;
    a polarized beam splitter which splits the light beam emitted from the laser diode into a first light beam and a second light beam and synthesizes signal light obtained from the first light beam with reference light obtained from the second light beam;
    an objective lens which irradiates the optical disc with the first light beam to obtain the signal light;
    a reflection element which reflects the second light beam with no irradiation of the optical disc with the second light beam to obtain the reference light;
    a phase difference forming unit which separates the light beam synthesized by the polarized beam splitter into a plurality of light beams and affords different phase differences to the signal light and the reference light included in each of the light beams; and
    a common detector including a plurality of light receiving parts which receives the plurality of separated light beams,
    wherein, the phase difference forming unit includes a grating, a divided wave plate and a polarization grating, and the divided wave plate has a plurality of regions, each region affords different phase differences to the incident light beams.

2. The optical pickup device according to claim 1, wherein the grating diffracts an incident light beam to separate the light beam into two or more light beams,
    the divided wave plate is segmented into two or more regions including a quarter wave plate and a half wave plate for affording predetermined phase differences to incident light beams,
    the polarization grating diffracts an incident light beam of a specific polarization to separate the light beam into two or more light beams,
    the two or more light beams separated by the grating are respectively incident on different regions of the divided wave plate, and
    the light beams that have passed through the respective regions of the divided wave plate are respectively incident on different regions of the polarization grating.

3. The optical pickup device according to claim 2, wherein the grating separates the incident light beam into two light beams,
    the divided wave plate includes two regions on which the two light beams so separated by the grating are incident,
    the polarization grating makes the two light beams that have passed through the divided wave plate incident and separates the light beams into four light beams in all by separating each light beam into two light beams, and
    the detector detects the four light beams that have been outgoing from the polarization grating by four light receiving parts to be used as detection signals for generation of a reproduction signal.

4. The optical pickup device according to claim 2, wherein the grating separates the incident light beam into three light beams,
    the divided wave plate includes three regions on which the three light beams so separated by the grating are incident,
    the polarization grating makes the three light beams that have passed through the divided wave plate incident and separates the light beams into six light beams in all by separating each light beam into two light beams, and
    the detector detects the six light beams that have been outgoing from the polarization grating by six light receiving parts to be used as detection signals for generation of a reproduction signal.

5. The optical pickup device according to claim 2, wherein the grating separates the incident light beam into two light beams,
    the divided wave plate includes two regions on which the two light beams so separated by the grating are incident,
    the polarization grating makes the two light beams that have passed through the divided wave plate incident and separates the light beams into six light beams in all by separating each light beam into three light beams, and
    the detector detects the six light beams that have been outgoing from the polarization grating by six light receiving parts to be used as detection signals for generation of a reproduction signal.

6. The optical pickup device according to claim 3, wherein the phase difference forming unit affords four phase differences, that is, 0°, 90°, 180° and 270° phase differences to the signal light and the reference light included in the separated light beams.

7. The optical pickup device according to claim 2, wherein the grating separates the incident light beam into three light beams,
    the divided wave plate includes three regions on which the three light beams so separated by the grating are incident,
    the polarization grating includes a first region, a second region and a third region interposed between the first and second regions on which the three light beams that have passed through the divided wave plate are incident, and the detector detects the light beams that have been outgoing from the first and second regions of the polarization grating to be used as detection signals for generation of a reproduction signal, and detects the light beams that have been outgoing from the third region of the polarization grating to be used as detection signals for generation of a focusing error signal and a tracking error signal.

8. The optical pickup device according to claim 7, wherein the third region of the polarization grating includes three regions, that is, a region X, a region Y and a region Z, and in disc diffracted light diffracted by tracks on the optical disc, 0-order disc diffracted light is incident on the region X, 0-order disc diffracted light and ±first-order disc diffracted light are incident on the region Y, and an almost central part of the 0-order disc diffracted light is incident on the region Z.

9. The optical pickup device according to claim 7, wherein a detecting lens having a lens region on its central part and a flat-plate region on its outer peripheral part is disposed between the polarization grating and the detector, and the detection signal for generation of the focusing error signal is obtained from the light beam that has been made astigmatic by making the light beam pass through the lens region of the detecting lens and the detection signal for generation of the tracking error signal is obtained from the light beam that has been made to pass through the flat-plate region of the detecting lens in the light beams that have been outgoing from the third region of the polarization grating.

10. The optical pickup device according to claim 1, wherein the grating is a hologram element that affords defocus aberration to an incident light beam when diffracting the incident light beam.

11. The optical pickup device according to claim 1, wherein in the detector, each light receiving part for generating a reproduction signal is divided into four parts.

12. An optical disc apparatus on which the optical pickup device according to claim 1 is loaded, comprising:

a laser lighting circuit which drives the laser diode included in the optical pickup device;

an information signal reproducing circuit which generates a reproduction signal of information recorded in an optical disc by using a detection signal obtained from the detector included in the optical pickup device; and a servo signal generating circuit which generates a focusing error signal and a tracking error signal by using detection signals obtained from the detector included in the optical pickup device.

\* \* \* \* \*